(12) United States Patent  
Krautloher (10) Patent No.: US 6,328,269 B1  
(45) Date of Patent: Dec. 11, 2001

(54) ORIENTATION DEVICE

(76) Inventor: Roland Krautloher, 6/16 Loyalty Road, North Rocks 2151 New South Wales (AU)

(*) Notice: Subject to any disclaimer, the term of this patent is extended or adjusted under 35 U.S.C. 154(b) by 0 days.

(21) Appl. No.: 09/423,329

(22) PCT Filed: May 6, 1998

(86) PCT No.: PCT/AU98/00325

§ 371 Date: Feb. 22, 2000

§ 102(e) Date: Feb. 22, 2000

(87) PCT Pub. No.: WO98/50728

PCT Pub. Date: Nov. 12, 1998

(30) Foreign Application Priority Data

May 6, 1997 (AU) .................................................. PO6638

(51) Int. Cl.[7] .................................................. A47F 5/00
(52) U.S. Cl. .................................................. 248/288.11
(58) Field of Search ...................... 248/278.1, 288.31, 248/288.51, 288.11

(56) References Cited

U.S. PATENT DOCUMENTS

| | | |
|---|---|---|
| 3,759,589 | 9/1973 | Rozentals . |
| 4,036,459 | 7/1977 | Alexander et al. . |
| 4,188,142 | 2/1980 | Olsson . |
| 4,273,116 | 6/1981 | Chiquet . |
| 5,118,058 * | 6/1992 | Richter ........................... 248/278.1 X |
| 5,251,859 | 10/1993 | Cyrell et al. . |
| 5,660,363 * | 8/1997 | Maglica ........................... 248/288.31 |
| 5,735,497 | 4/1998 | Haas et al. . |
| 5,921,694 * | 7/1999 | Herbermann ................ 248/288.51 X |
| 6,138,970 * | 10/2000 | Sohrt et al. .................... 248/278.1 X |

FOREIGN PATENT DOCUMENTS

| | | |
|---|---|---|
| 922450 | 1/1955 | (DE) . |
| 1115036 | 10/1961 | (DE) . |
| 0481540 | 4/1992 | (EP) . |
| 0705990 | 4/1996 | (EP) . |
| 294456 | 8/1928 | (GB) . |

* cited by examiner

Primary Examiner—Ramon O. Ramirez  
(74) Attorney, Agent, or Firm—Klein & Szekeres, LLP (57) ABSTRACT

An adjustable orientation device includes a rigid spherical bearing surface and a sleeve made of a hard, non-viscoelastic material. The sleeve defines an inner surface which is part-spherical and is configured to receive the spherical bearing surface having substantially the same radius of curvature as the part-spherical inner surface and also defines at least one gap. The device includes a means for adjusting the size of the gap in the sleeve, typically a screw clamp which may be associated with an outer sleeve. When the gap is relatively wide, the sleeve can move freely over the spherical being surface, however when the gap is narrowed frictional engagement between the sleeve and the bearing surface increases and clamps the sleeve and the bearing surface in a fixed orientation. The device can be used to mount various object particularly speakers and projectors.

14 Claims, 6 Drawing Sheets

ORIENTATION DEVICE

FIELD OF THE INVENTION

This invention relates to an orientation device. In particular, the invention relates to improvements in adjustable, clampable, orientation devices for mounting equipment including, particularly but not exclusively, speakers, microphone stands, slide projectors and the like.

BACKGROUND OF THE INVENTION

Problems arise when using slide projectors, and similar equipment, to project images onto screens in large halls, such as university lecture theatres and the like. In large halls, the slide projectors are generally located a considerable distance from the screen, so that small adjustments to the alignment of the slide projector are magnified and translate into much larger movements of the projected image on the screen. To align the image properly, requires careful adjustment and aiming which is done by rotating, tilting and yawing the slide projector. Most projectors have adjustable legs for that purpose but they are crude and wobbly and cannot prevent misalignment when the projector gets bumped or nudged.

In order to solve the above problem, the inventors of the invention to be described hereinafter, looked at various existing devices which provide swivel links/orientation devices which they believed might be suitable for use in orienting and aligning slide projectors and the like. However, while many of the devices which provided swivelling with clamping/locking had good locking capabilities, they could not be finely adjusted while being partially clamped. In other devices with good adjusting properties the locking was insufficiently strong and reliable. Many of the existing devices were also over-complicated and in some cases correspondingly expensive due to their providing movement and clamping about three orthogonal axes.

A typical swivel mechanism utilises one axle per axis, requiring one locking mechanism per axis such as in a typical camera tripod, and while this system is functional, it requires adjustment of three different clamps for adjustment in three different axes.

Another prior art device is a theatre light mounting. That device comprises a spherical member coated with a deformable soft plastic. The member is fitted into a concave mating socket which has truncated spikes protruding inwards. When the device is clamped, the spikes are pressed into the plastic. This device holds its orientation well. However, the plastic retains the spike depressions for a long time and this makes the device unsuitable for quick re-alignment. Also, it is difficult to make slight adjustments with this device.

Similar problems exist with stands and mounts for mounting large speakers.

It is an object of the present invention to alleviate the problems of the existing orientation devices described above.

SUMMARY OF THE INVENTION

According to the present invention there is provided an adjustable orientation device including:

a first part including a rigid part-spherical bearing surface;

a second part including a sleeve made of a hard, non-visco-elastic material, the sleeve defining an inner surface which is part-spherical and is configured to receive the part-spherical bearing surface, having substantially the same radius of curvature as the part-spherical bearing surface, the sleeve defining at least one gap; and adjustment means for adjusting the size of that gap, the arrangement being such that when the gap is relatively wide the sleeve can be moved freely over the spherical surface, the gap being arranged to be narrowed by the adjustment means characterised in that as the adjustment means is progressively tightened resistance to relative movement of the sleeve over the surface is also progressively increased allowing smooth controlled movement of the parts at different levels of friction providing clamping ranges from light locking to rigid locking when frictional engagement between the sleeve and the bearing surface retain the sleeve and surface in a fixed orientation and wherein the engaging surfaces of the bearing surface and sleeve are resistant to galling.

The preferred bearing surface is defined by a sphere with a large central bore extending from one pole of the sphere to the opposite pole to define a cylindrical bore suitable for receiving a shank.

A particularly simple method of manufacturing an orientation device embodying the present invention is by customising an existing spherical bushing. Spherical bushings are made be a number of manufacturers including IKO Nippon Thomson Co., Ltd of Japan. Typically such a bushing consists of two parts: a ball with a large hole through it for a shank, sitting in a sleeve which is machined to the contour of the ball. The sleeve has an axial split, to enable the ball to be inserted in the sleeve which is closed in use when the bushing is assembled. If material around the split is removed to widen the split to define a gap, the sleeve can be compressed until the ball cannot be moved any more.

Thus the present invention provides, an adjustable link, or orientation device, which, when fitted to a support, allows adjustment of the orientation of the equipment mounted to it. One element, say the spherical surface is connected directly or indirectly to the equipment, the other element being the sleeve is attached to the surface or object to which the equipment is to be mounted. This link has associated with it methods of clamping so that the equipment may be held at any orientation within the scope of operation of the support. Clamping may be of varying degrees to provide effects which range from light holding to rigid locking. In the case of equipment which is re-orientated often by hand, by careful adjustment, it is possible to provide just enough resistance to hold the equipment at a suitable orientation and also readily allow movement when subjected to any additional force. Thus, the orientation device can be adjusted under light resistance and then tightened and importantly, when tightening, the device will not slip. The relative orientation of the components stays the same.

In one aspect of the invention clamping is obtained hydraulically by means of cylindrical bore having a groove or channel extending around the inner circumference of the bore and a sleeve or the like covering the channel/groove such that application of pressure to a hydraulic medium in the groove causes the sleeve to bow inwards to clamp a cylindrical object, such as the sleeve or possibly an axle, in the bore.

Typical uses for the present invention include mounting speakers, in boom microphones, and slide projectors; mounting overhead, video and film projectors; mounting lights, video, still and film cameras; mounting optical, electro magnetic and acoustic transmitters and receivers; mounting viewing equipment such as magnifiers, binoculars, telescopes; mounting display equipment such as placard, card and label holders; signs, mirrors, and in tool holding and work holding equipment e.g. swivel vices.

When the device is to be used for mounting slide projectors and lenses there is a need to prevent unauthorised people from removing the projector or lens from the hall or the like where the projector is fitted. Thus in a preferred embodiment the invention provides a plate to which the projector can be secured, a lens retention device, such as a ring extending around the lens, the ring being secured to the plate, and an orientation device of the present invention, one element of which is secured to the plate and the other element being securable to a table bench, ceiling or other surface on or to which the projector is to be mounted Normally the slide projectors are mounted in a room at the back of a lecture theatre where the projector projects through a window to the screen at the front of the theatre. The projection lamps sometimes need to be replaced during a slide show and are therefore in many projectors hold replacement lamps in a drawer like cartridge which pulls out from the back of the projector. When the projector is mounted against the back wall of a classroom or lecture theatre, access to this module requires turning the projector and this means that the projector has to be re-aligned afterwards.

Thus, in another aspect of the invention the clamping means includes means for allowing the projector and mounting assembly to turn in one direction away from a project position, a stop means which set at the project position and biasing means to bias the projector towards the stop means.

DETAILED DESCRIPTION OF THE PREFERRED EMBODIMENTS

Figure 1:
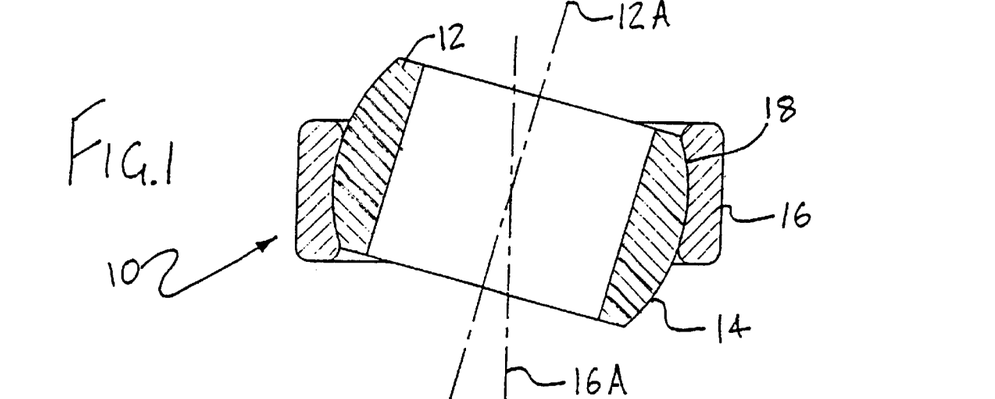
FIG. 1 shows a sectional view of a typical spherical bushing.

Referring to the drawings, FIG. 1 shows a section through a typical spherical bushing 10 comprising an inner ring 12 whose outer surface 14 is spherical and an outer ring, or sleeve, 16, whose inner surface 18 is also part-spherical and defines the surface of a spherical segment. In such a spherical bushing the inner ring is free to rotate about its central axis 12A. The ring 12 is also free to turn inside the sleeve 16 so that its axis 12A turns relative to the axis 16A of the sleeve. Such bushings are well known in the art and are often used in heavy machinery such as cranes bulldozers and the like and are particularly used to mount ends of large hydraulic cylinders, with a shank being mounted in the inner ring. Such bushings are typically manufactured in a hard steel material such as high carbon chromium bearing steel, and the surfaces 14, 18 of the bushing are often coated to improve wear, smoothness, decrease friction etc. Typically, the bearing surfaces are phosphate-treated and coated with molybdenum disulphide.

The inner ring is inserted in the sleeve by means of a split in the sleeve which is opened in the assembly process to insert the inner ring and which is otherwise completely closed in the finished bushing.

Figure 2:
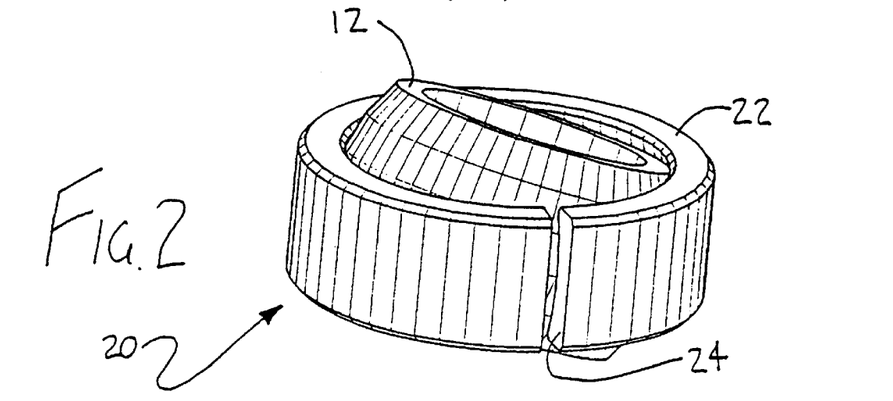
FIG. 2 shows a typical spherical bushing but with an added gap in the outer ring.

FIG. 2 shows a first embodiment of the present invention, generally indicated at 20, which includes an inner ring 12 identical to the ring shown in FIG. 1 and whose outer ring, or sleeve, 22 is similar to the sleeve shown in FIG. 1 but in which material on one side of the split present in the sleeve has been removed to define a gap 24. If the outer ring 22 is now compressed to narrow the gap it will hold the inner ring 12, firmly.

Figure 3:
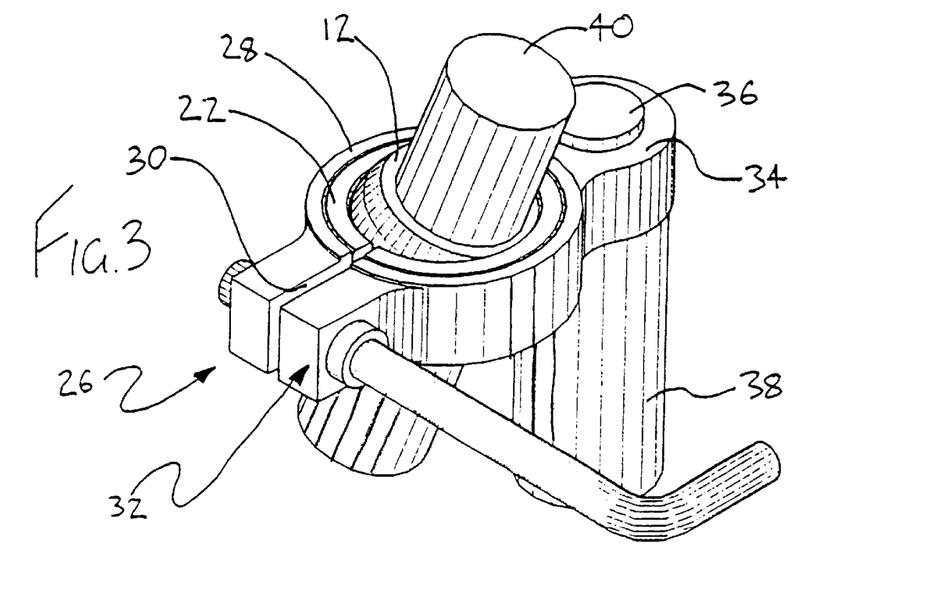
FIG. 3 shows the bushing of FIG. 2 fitted into first clamping mechanisms wit a stem added.

FIG. 3 shows the device 20 incorporated in a clamping means 26 for compressing the outer ring 22 of the device. The device includes a further ring, or outer clamping ring 28 which is disposed around sleeve 22 which defines a gap 30 which can be closed to compress the outer clamping ring 28, and hence compress sleeve 22, by means of a screw clamp mechanism, generally indicated at 32. The outer clamping ring is fixed to or integral with a collar 34 which is in turn attached around a protrusion 36 at the top of a stem or pillar 38. A further shank or rod 40 is mounted in the inner ring 12.

It is to be noted that there is no gap between the sleeve 22 and the outer clamping ring 28 which acts directly on the sleeve 22 and compresses it radially.

Thus the present invention provides, an adjustable link, or orientation device, which, allows adjustment of the orientation of the rod 40 relative to stem 38. Typically, in practical applications rod 40 or stem 38 will have equipment mounted to it or indirectly bear such equipment so that the adjustment allows the orientation of the equipment to be altered. The equipment may be held at any orientation within the scope of operation of the clamping means/support 32. Clamping may be of varying degrees to provide effects which range from light holding to rigid locking. In the case of equipment which is re-orientated often by hand, the clamping device is able by careful adjustment of the screw clamp to provide just enough friction resistance between outer surface 14 and the inner surface 18 of the sleeve to hold the equipment at a suitable orientation and also readily allow movement when subjected an additional force. Once the correct orientation has been obtained, the device can be firmly clamped in place by tightening the screw clamp 32. Importantly, when the additional tightening is carried out, the orientation of the components of the device will not change.

Although, the particular materials and coatings used are not essential to the present invention, the materials must have suitable properties. The materials must be hard. The sleeve material at least must be non-visco-elastic, ie it must not creep, or deform plastically under stress under the loads applied. Elastomers such as rubber, and soft easily deformable plastics are unsuitable. The materials should preferably have a high modulus of elasticity, at least 50000 psi, and preferably 100000 psi or more. Any deformation of the sleeve under the loads applied should be in the region where the material used behaves substantially elastically.

Figure 4:
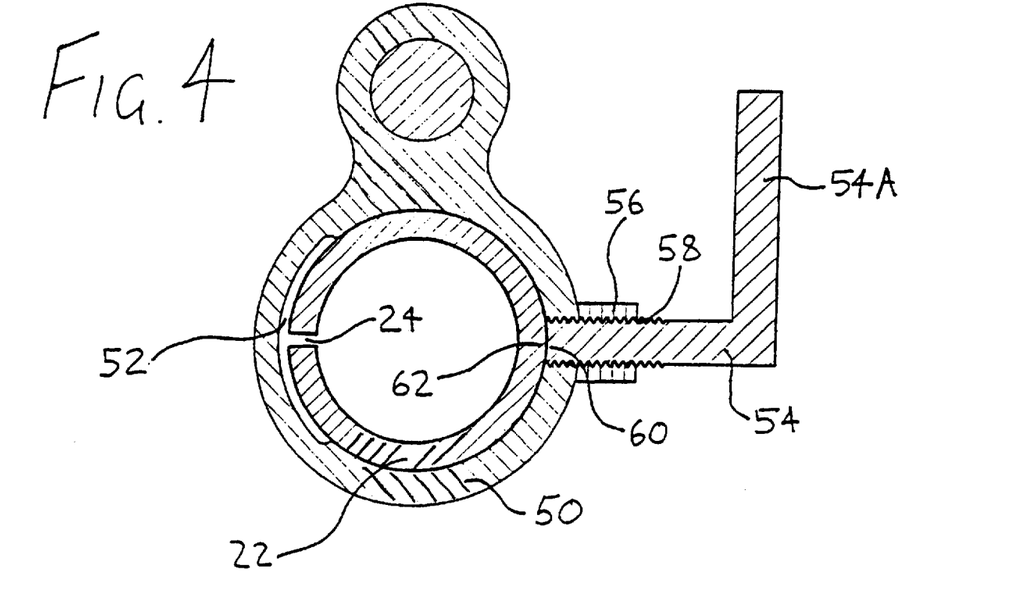
FIG. 4 shows sectional view of a second clamping mechanism using a screw and two opposite contact points.

FIG. 4 shows a cross section through a similar device to that shown in FIG. 3 but in which an alternative clamping mechanism is utilised. In this embodiment the sleeve is held in a collar 50, which extends around the outer surface of the sleeve but defines an arcuate space 52 which extends around the outside of the sleeve 22, either side of the gap 24. The two ends of the space 52 define contact points. A block 56 is attached to the opposite side of the collar to the gap and a threaded hole 58 extends through that block and the collar. A correspondingly threaded rod 54, defining a handle 54A is located in the hole 58. In this embodiment clamping is achieved by turning the handle to cause the end 60 of the rod to impinge on the area 62 of the sleeve 22 opposite to the gap 24 to deform the sleeve and thus cause it to lock or clamp the inner ring, not illustrated in FIG. 4. The contact points help to ensure that the clamping is provided on the sides of the inner ring at 120° to the end 60 of the rod.

Figure 5:
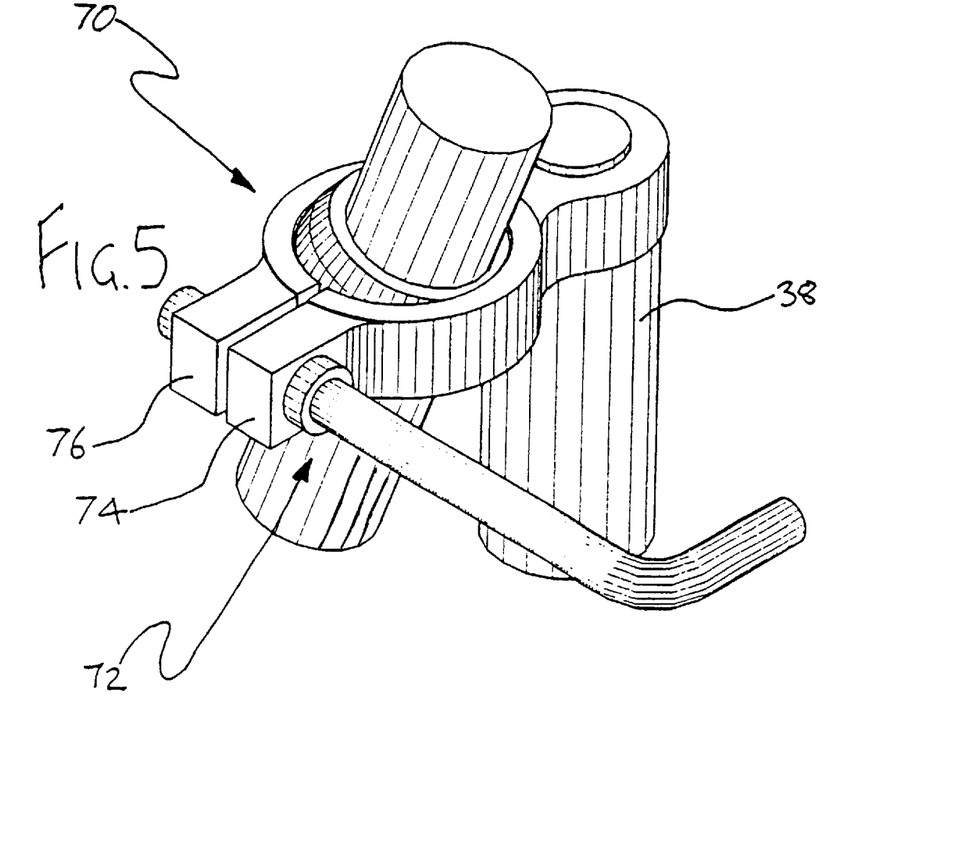
FIG. 5 shows a further embodiment of a clamping mechanism.

FIG. 5 shows a further embodiment 70 which is very similar to that shown in FIG. 3 however as illustrated the outer clamping ring is not used and the screw clamp 72 is mounted in blocks 74 and 76 which are attached directly to the sleeve which acts as a structural element and transmits loads to the stem 38.

Figure 6:
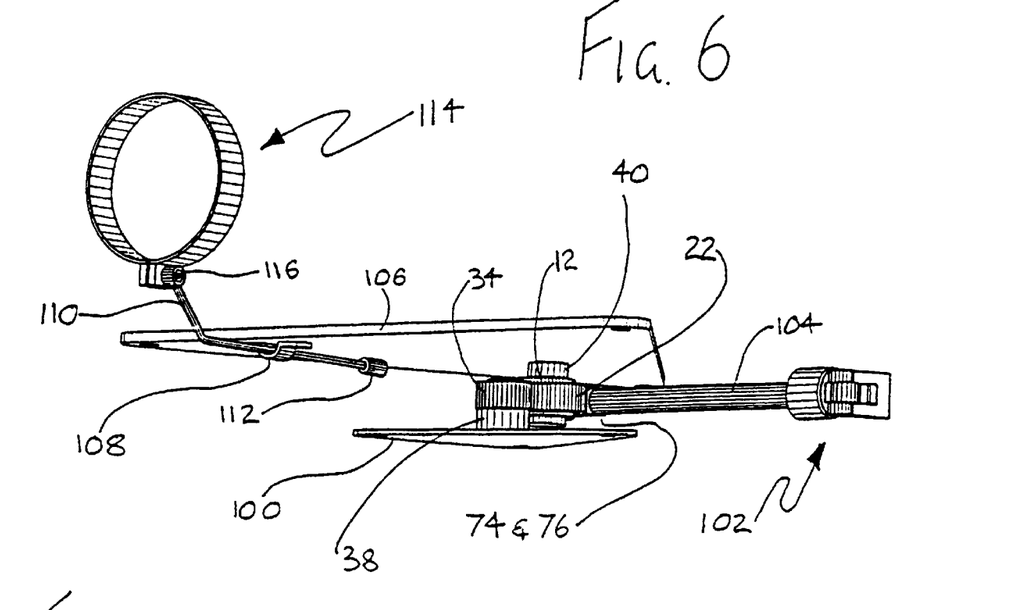
FIG. 6 is a schematic drawing of a projector mount.

FIG. 6 shows a schematic drawing of a device for mounting a slide projector utilising the principals of the present invention.

A pillar 38 is attached to a mounting plate 100. Attached to this pillar is a collar 34 and sleeve 22 which encircles an inner ring 12 which is mounted on a shank or rod 40 in an assembly similar to that shown in FIG. 5. A cam operated tensioning device indicated at 102 acts on the clamping blocks 74 and 76 through a stalk 104. A plate 106 is attached to shank 40. Attached to this plate is a saddle 108 through which passes a rope or rod 110 which has an end 112 enlarged so that it cannot pass through the saddle. The other end of rope or rod 110 is attached to a lens lock indicated at 114 comprising a split ring similar to a hose clamp which encircles a lens 122, shown in FIG. 7, to prevent unauthorised removal of the lens. A screw 116 or other more secure device clamps the two ends of the split ring together.

The stalk 104 is of a length that brings the tensioning device 102 to the side of the projector for ease of use. Where this fixture is used to attach other projectors, such as video/data projectors to the underside of a ceiling or pole, the stalk may be flexible and long enough to bring the tensioning device to below the projector for ease of access.

Figure 7:
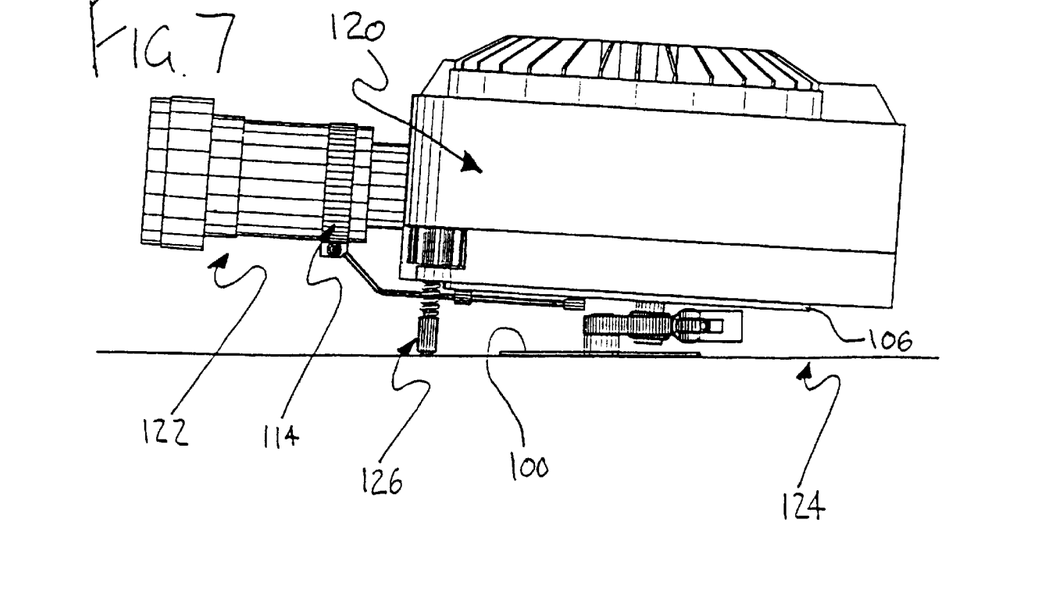
FIG. 7 is a schematic drawing of a projector mounted on the projector mount of FIG. 6.

FIG. 7 shows a schematic drawing of a projector 120 mounted to plate 106 of the assembly shown in FIG. 6 with the lens 122 clamped in the lens lock 114 and the mounting plate 100 attached to a table, indicated at 124. Orientation with the screen is achieved by rotating the projector sideways and tilting the projector using the built in screw adjustable feet 126 the orientation device is clamped after all adjustments are made.

Typical uses for the present invention include mounting overhead, video and film projectors; mounting speaker microphones, lights, video, still and film cameras; mounting optical, electro magnetic and acoustic transmitters and receivers; mounting viewing equipment such as magnifiers, binoculars, telescopes; mounting display equipment such as placard, card and label holders; signs, mirrors, and in tool holding and work holding equipment e.g. swivel vices.

Aside from what is described above, various mechanisms for contracting the outer ring or segments can be used to provide a smooth increase in friction to the point of locking. The swivel locks may be compressed using electromotive, hydraulic (liquid or gas) force or by screw, cam, joggle, or lever action. The clamping mechanism may take the form of a split collet with the spherical inner member held in a matching shape formed within the fingers of the collet.

Although in the above described embodiments the gap 24 in the sleeve 22 is made by removing material, the sleeve could be manufactured with a gap, or gaps.

Although in the above described embodiments the sleeve has a single gap, a sleeve having more than one gap could be used in appropriate housings.

As an alternative to a compressible sleeve, the sleeve can be cut into segments, and mounted a partly slotted housing with a conic outer wall. Compressing is done by pulling or pushing this into a corresponding cone, much like collets used in metal working. The sleeve could be replaced because the contour of the ball could be machined into such a collet.

Figure 8:
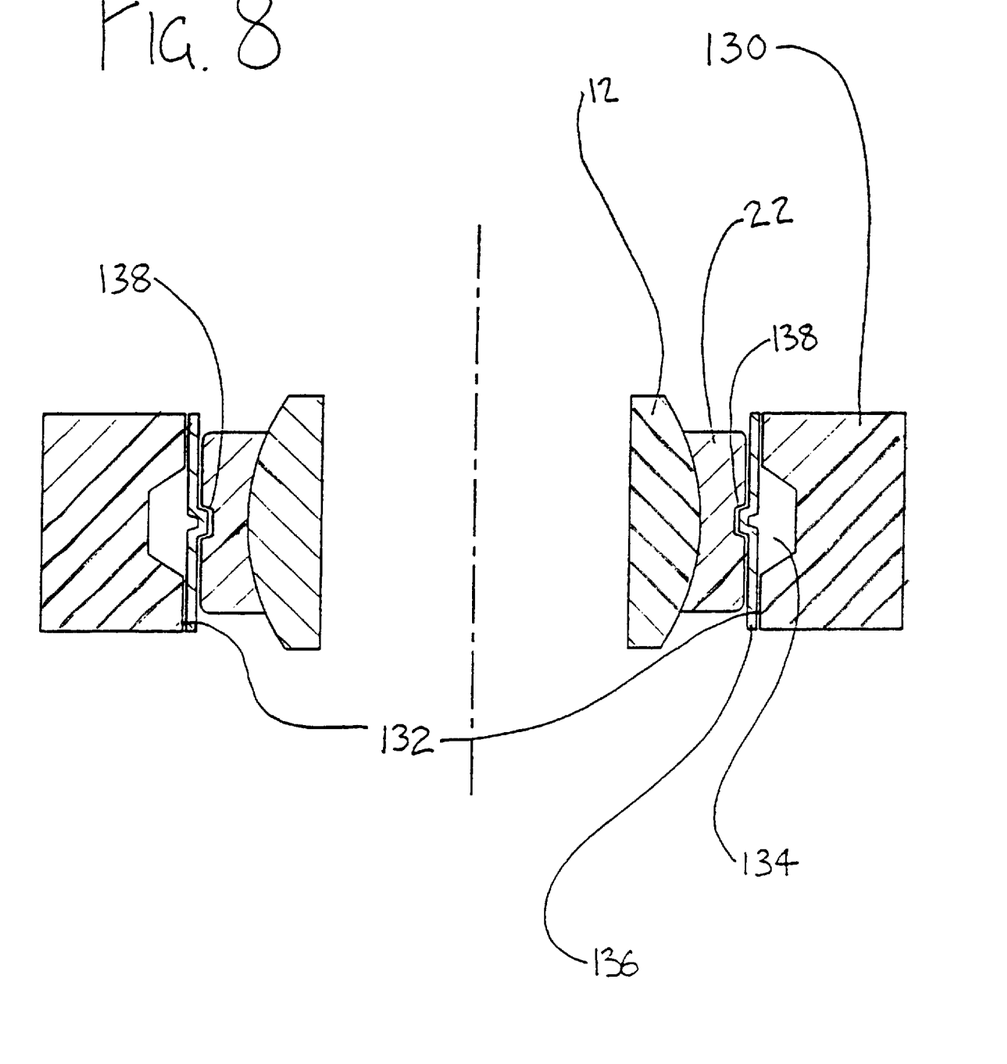
FIG. 8 shows a further embodiment of a clamping mechanism.

FIG. 8 shows a sectional view through a further device 128 incorporating an alternative method of adjusting the size of the gap in the outer ring 22 of an orientation device of type already described and shown in FIG. 2, at 20. The device 128 could also be used in many of the mechanisms described above.

The device 128 includes a generally annular housing 130, which defines a central cylindrical bore generally indicated at 132. The bore defines an annular groove 134 which extends circumferentially around the inner surface of the bore. The bore is sealed by a sleeve 136, and an hydraulic medium in the bore can be pressurised which causes the sleeve 136 to bulge inwards which will compress the outer ring 22 which is disposed in the bore compressing, it which will narrow the gap 24 thereby causing the outer ring to clamp against the inner ring.

As can be seen from FIG. 8, there is an annular groove 138 which extends around the outside of the outer ring 22. When pressure is applied to the hydraulic medium in the groove 134 the sleeve 136 is pressed against the external surface of the outer ring 22 and the sleeve 136 will distort and become pressed into the groove 138. If the sleeve is made from material which will retain its shape after distortion, the shape of the annular groove 138 becomes reflected in the sleeve preventing the device 20 from being removed from the housing after the hydraulic pressure has been removed.

In the embodiment described above, the sleeve is bonded to the housing 130 to seal the bore 134.

However in an alternative embodiment the sleeve could be made as part of the housing 130.

There are other uses for this method of applying pressure. For example the housing 30 with sleeve 136 can be placed directly around a shaft and when pressure is applied movement in the shaft relative to the housing could be controlled, slowed or stopped. Various materials could be used in the sleeve or in coatings applied to it which could vary its properties.

The bore and sleeve may take the form of shapes other than cylindrical. For example the bore and shaft may be square, splined, or oval. When the matching housing with sleeve is used and hydraulic pressure is applied, the sleeve will bulge and press against the shaft.

This method may also be used on an external surface, where the sleeve form part of the outer surface of a shaft. Again the bore, shaft and sleeve do not need to be cylindrical.

Some uses for these devices are as dampers on swing arms of vehicles, bicycles and other suspension arms where the axle around which the swing arm rotates is held in a housing as described above and by applying hydraulic pressure to the housing where the sleeve includes or acts on a friction surface, the action of the swing arm is controlled. By varying the hydraulic pressure the swing arm damping could be modified to suit altering conditions. This device could replace or augment traditional shock absorbers. The method can be used to replace the mechanical components of a drum brake.

Figure 9:
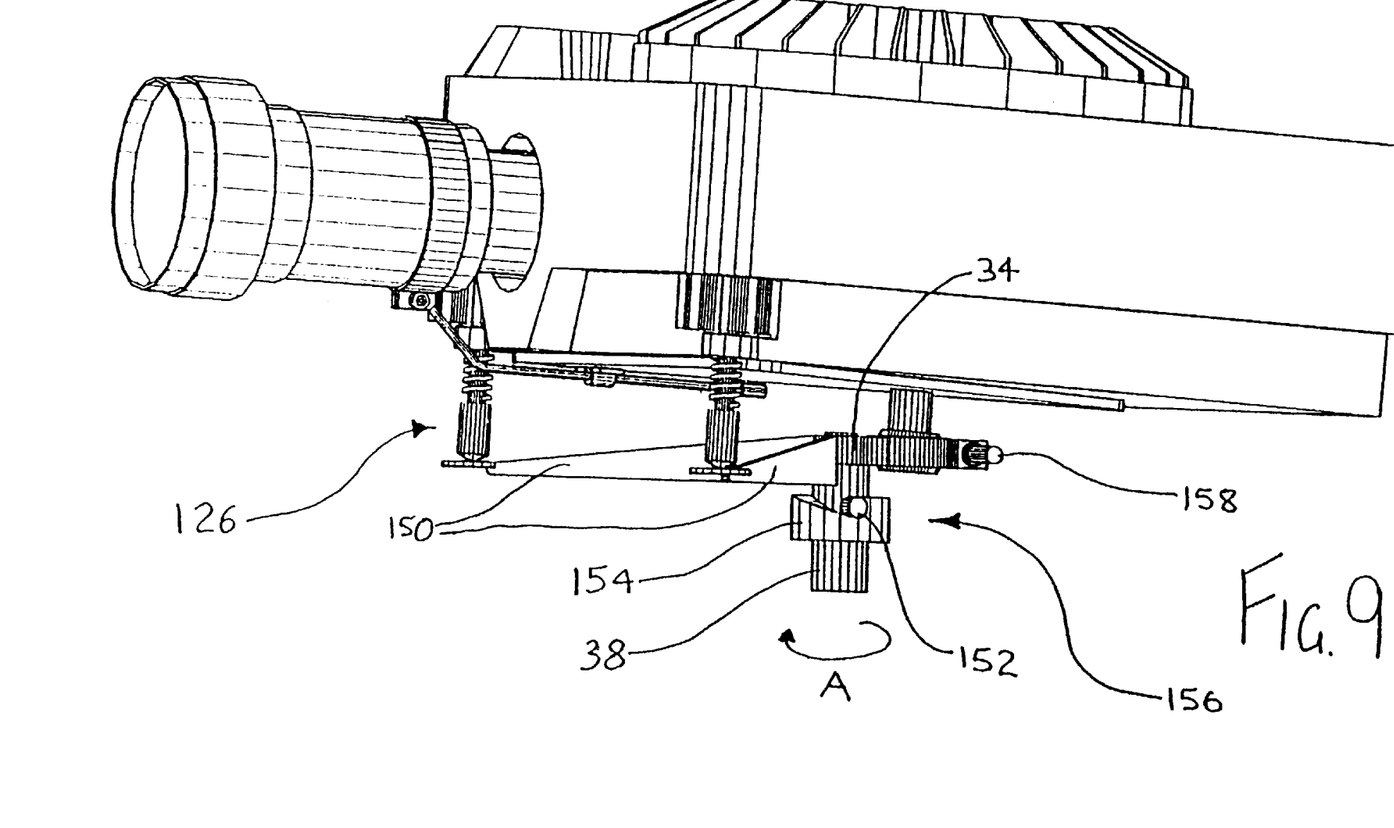
FIG. 9 is a schematic drawing of a projector mounted on a second embodiment of a projector mount.

FIG. 9 shows a variation on the projector mount illustrated in FIGS. 6 and 7, which allows a slide projector to be rotated in order to access a replacement lamp housed in a lamp module of the projector.

Normally, slide projectors are mounted in a room at the back of a lecture theatre and the projector projects a beam light through a window to a screen at the front of the theatre. In some cases however, slide projectors are merely mounted against the back of the theatre. Occasionally, during a slide show, the projector lamp will blow and require replacement and many projectors thus include a drawer, which pulls out from the back of the projector and in which replacement lamps are usually placed in the event that a projection lamp will blow during a slide show. However, when the projector is mounted against the back wall of a lecture theatre or classroom, access to the lamp module requires one to turn the projector and this means that the projector has to be realigned afterwards.

Thus, FIG. 9 shows a variation of the projector mount shown in FIGS. 6 and 7 which allows the projector to rotate through sufficient of an arc to gain access to the lamp module and then allow the projector to return to the project position without the need for careful adjustment. As can be seen from the drawing, two arms 150 project from the collar 34 and the ends of those arms 150A define a circular plate on which the adjustable feet 126 of the projector sit. A pin 152 is fitted to the pillar 38 and this is supported by a collar 156. The collar defines a ramp or cam fit surface 154 on which the pin travels when the projector is turned about the axis of the pillar (in the direction of arrow A) to allow access to the rear of the projector and the lamp draw. Once the lamp has been accessed the projector can be allowed to automatically rotate back to the project position biased by gravity. The cam block 156 can be fitted to a table.

Although FIG. 9 shows an arrangement in which a ramp and pin cooperate with a stop to produce a device for lowering a projector to rotate axis to rear projector, the return being assisted by gravity, a spring or other resilient device could be used to force the projector back to the project position and a ramp is not essential.

Figure 10:
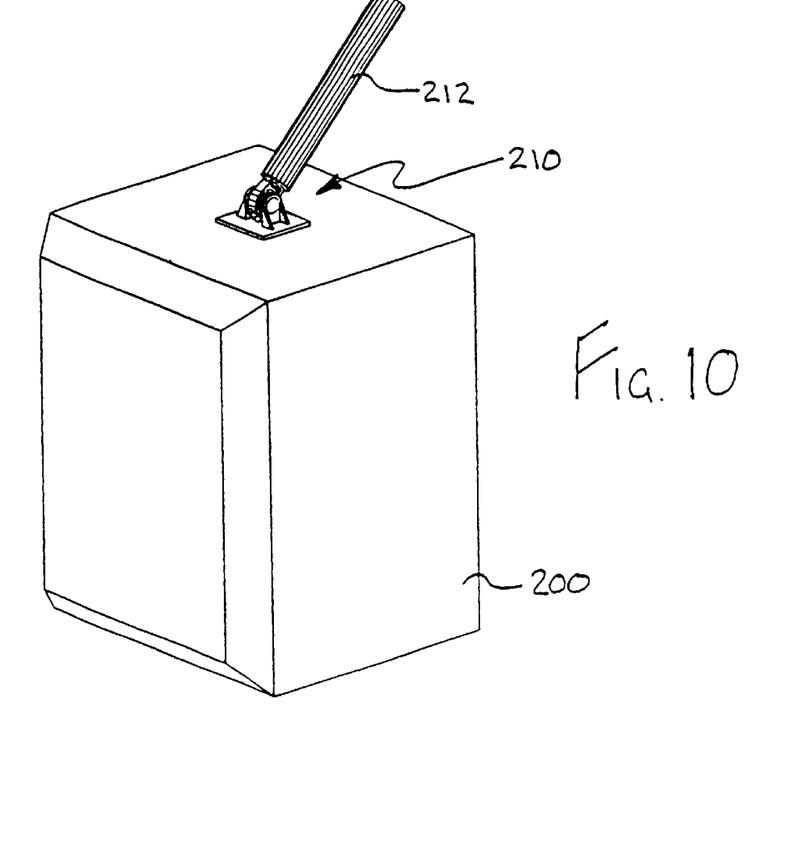
FIG. 10 shows a speaker on a mounting.
Figure 11:
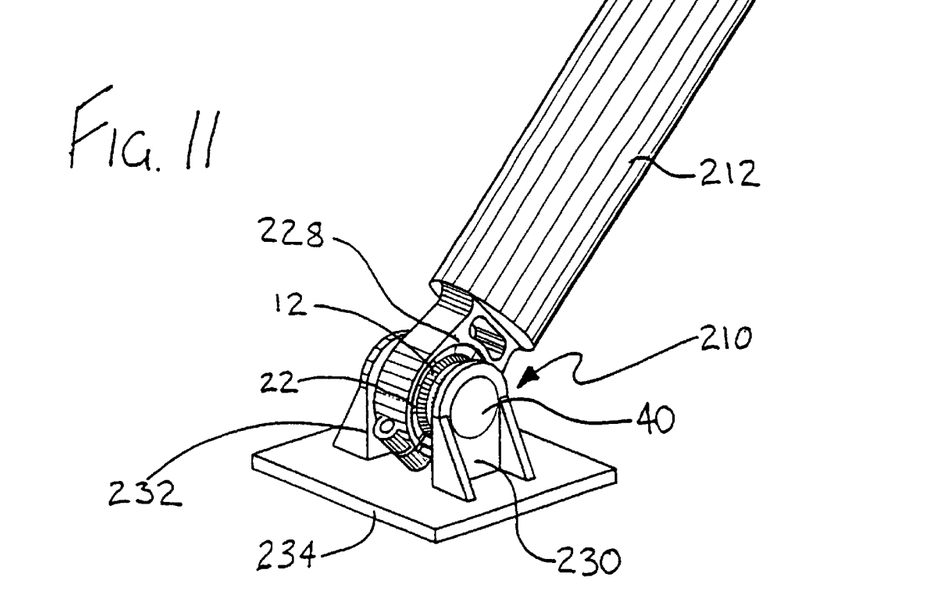
FIG. 11 is an enlarged view of the mounting of FIG. 10.

FIGS. 10 and 11 show a speaker 200 fixed to a mounting, generally indicated 210 embodying the present invention. The mounting is fixed to one of a support rod 212. The mounting 210 incorporates a orientation device embodying the present invention which can be used to adjust the orientation of the speaker in three dimensions. The other end of the rod may be fixed or may also incorporate an orientation device embodying the present invention. As can be seen, the split sleeve 28 is enclosed in an outer ring or outer sleeve 228. The threaded clamp for tightening the sleeve 228 around the bore 12 is not shown for clarity. A rod 40 passes through the centre of the spherical bearing 12. The ends of the rod are fixed to two metal plates 230, 232 which in turn are fixed to a further plate oriented perpendicular to the metal plates 230, 232 which can be fixed to a speaker by screws or the like for mounting the mounting device to a speaker. This device can be used to safely mount speakers weighing several hundred pounds and accurately align them.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An adjustable orientation device, comprising:
   a first part including a rigid part-spherical bearing surface;
   a second part including a first sleeve made of a hard, non visco-elastic material, the first sleeve defining an inner surface that is part-spherical and is configured to receive the part-spherical bearing surface, having substantially the same radius of curvature as the part-spherical bearing surface, the first sleeve defining a gap; and
   adjustment means for adjusting the size of the gap, such that when the gap is relatively wide the first sleeve can be moved freely over the bearing surface, wherein, as the adjustment means is tightened, resistance to movement of the first sleeve over the bearing surface is increased, allowing smoothly-controlled movement between the first and second part at different levels of friction, thereby providing a clamping action in ranges from light locking to rigid locking when frictional engagement between the first sleeve and the bearing surface retains the sleeve and the bearing surface in a fixed orientation;
   wherein the clamping action is obtained hydraulic means including a cylindrical bore having a groove or channel extending around the inner circumference of the bore and containing a hydraulic medium, and a second sleeve covering the channel or groove, such that the application of pressure to the hydraulic medium causes the second sleeve to bow inwardly to clamp a cylindrical object in the bore; and
   wherein the bearing surface and the inner surface of the first sleeve are resistant to galling.

2. The device of claim 1, wherein the first sleeve is made of a material having an elastic modulus of greater than 50,000 psi.

3. The device of claim 1, wherein the bearing surface is defined by a sphere with a cylindrical bore extending diametrically through the sphere.

4. A projector mount for mounting a projector on a mounting surface, the mount comprising a plate to which a projector can be secured, a lens retention device secured to the plate, and the orientation device as defined in claim 3, wherein a shank passes through the bore of the sphere and is secured to the plate, and wherein the first sleeve is securable to the mounting surface.

5. The projector mount of claim 4, further comprising:
   means for allowing the projector and mounting assembly to turn in one direction away from a projecting position;
   stop means for setting at the projecting position; and
   biasing means for biasing the projector toward the stop means.

6. A method of making an adjustable orientation device as defined in claim 3, comprising the steps of:
   providing an assembly including means for compressing the first sleeve around the sphere;
   removing material from around a split in the first sleeve to define the gap;
   fixing the first sleeve around the sphere in the assembly; and
   employing the means for compressing to compress the sleeve, thereby to narrow the gap.

7. A speaker incorporating an adjustable orientation device as claimed in claim 1.

8. An adjustable orientation device, comprising:

a first part including a rigid part-spherical bearing surface;

a second part including a first sleeve made of a hard, non visco-elastic material, the first sleeve defining an inner surface that is part-spherical and is configured to receive the part-spherical bearing surface, having substantially the same radius of curvature as the part-spherical bearing surface, the first sleeve defining a first gap; and adjustment means for adjusting the size of the first gap, such that when the first gap is relatively wide the first sleeve can be moved freely over the bearing surface, wherein, as the adjustment means is tightened, resistance to movement of the first sleeve over the bearing surface is increased, allowing smoothly-controlled movement between the first and second parts at different levels of friction, thereby providing a clamping action in ranges from light locking to rigid locking when frictional engagement between the first sleeve and the bearing surface retains the sleeve and the bearing surface in a fixed orientation;

wherein the clamping action is obtained by clamping means including an outer ring or sleeve member enclosing the first sleeve, the outer ring or sleeve member defining a second gap, wherein radial compression of the outer ring or sleeve member to close the second gap compresses the first sleeve; and wherein the bearing surface and the inner surface of the first sleeve are resistant to galling.

9. The device of claim 8, wherein the first sleeve is made of a material having an elastic modulus of greater than 50,000 psi.

10. The device of claim 8, wherein the bearing surface is defined by a sphere with a cylindrical bore extending diametrically through the sphere.

11. A projector mount for mounting a projector on a mounting surface, the mount comprising a plate to which a projector can be secured, a lens retention device secured to the plate, and the orientation device as defined in claim 10, wherein a shank passes through the bore of the sphere and is secured to the plate, and wherein the first sleeve is securable to the mounting surface.

12. The projector mount of claim 11, further comprising:

means for allowing the projector and mounting assembly to turn in one direction away from a projecting position;

stop means for setting at the projecting position; and biasing means for biasing the projector toward the stop means.

13. A method of making an adjustable orientation device as defined in claim 10, comprising the steps of:

providing an assembly including means for compressing the first sleeve around the sphere;

removing material from around a split in the first sleeve to define the first gap;

fixing the first sleeve around the sphere in the assembly; and employing the means for compressing to compress the sleeve, thereby to narrow the first gap.

14. A speaker incorporating an adjustable orientation device as claimed in claim 8.

\* \* \* \* \*